United States Patent [19]

Miller

[11] 4,189,203
[45] Feb. 19, 1980

[54] CIRCULAR CONNECTOR
[75] Inventor: John W. Miller, Smyrna, Ga.
[73] Assignee: The United States of America as represented by the Secretary of the Air Force, Washington, D.C.
[21] Appl. No.: 927,434
[22] Filed: Jul. 24, 1978
[51] Int. Cl.² .......................... G01B 7/12; G01B 7/28; H01R 13/64
[52] U.S. Cl. .................................. 339/184 M; 73/1 J
[58] Field of Search ......... 73/1 J; 339/184 M, 258 R, 339/258 RR

[56] References Cited
PUBLICATIONS

"Dimensional Evaluation of Tapered Fastener Systems," Interim Technical Report, Lockheed-Georgia Co., Mar. 1977.

Primary Examiner—Eugene F. Desmond
Attorney, Agent, or Firm—Joseph E. Rusz; Casimer K. Salys

[57] ABSTRACT

A high contact density circular connector capable of receiving, indexing, and fixedly holding a multi-element probe tip used to test the quality of tapered fastener holes. The outer surface of the probe tip has a multiplicity of conductive segments, which are covered by a thin layer of insulation at the end to be inserted into the holes being inspected. When the probe tip is inserted into a hole, capacitors are formed between the conductive segments on the probe tip and the metallic walls of the hole, which can be measured for value and correlated in a computer to disclose hole characteristics such as size, shape, and smoothness. The circular connector is the means by which probe measurements are transferred from the tip into a coaxial cable, for transmission to the electronic processor without molesting the minute capacitance measurements. The connector receives the probe tip, and by means of a key, indexes the angular orientation of the cylindrically shaped probe tip to mate appropriate conductive segments on the probe tip with the connector clips within the body of the circular connector. With the probe tip in place, a compression ring encircling the connector is rotated to draw the connector body and contacts tightly about the probe tip, thereby insuring effective electrical mating and fixed retention of the probe tip in the connector.

1 Claim, 3 Drawing Figures

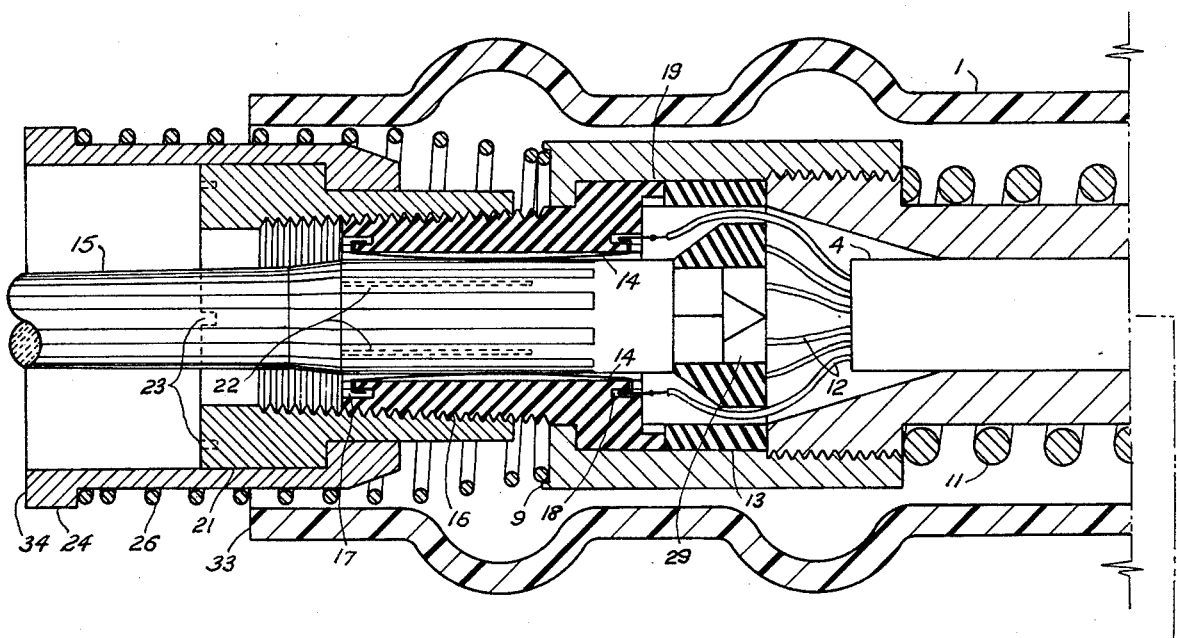
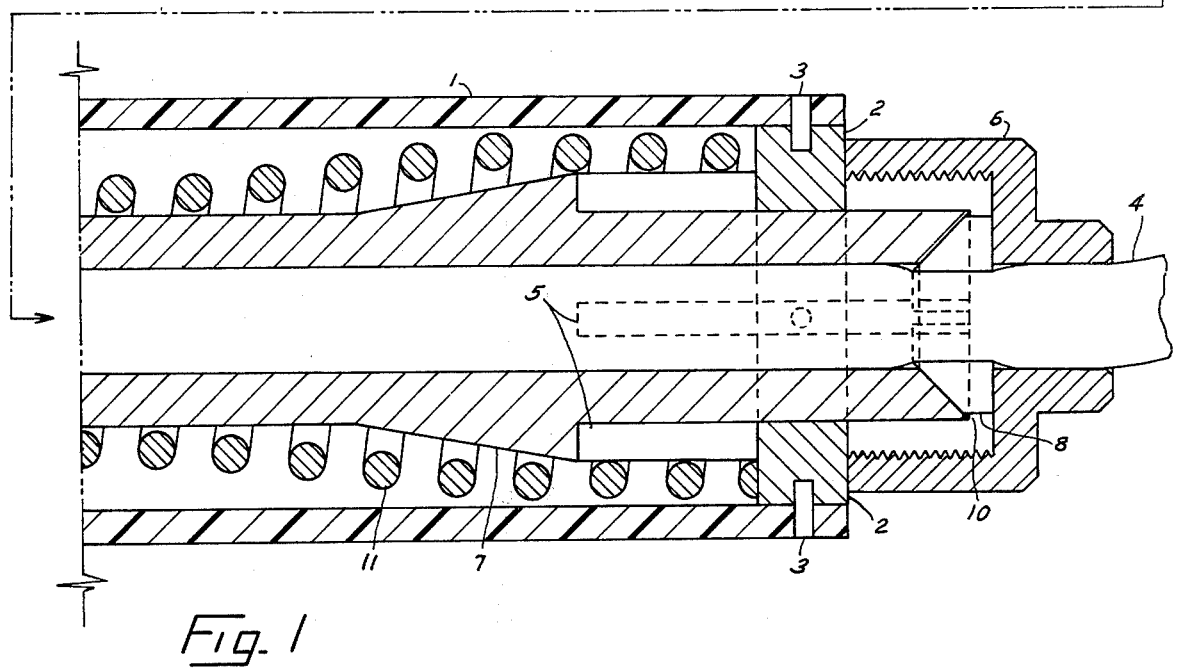
Fig. 1
Fig. 2a
CERAMIC GLASS COATING
Fig. 2b
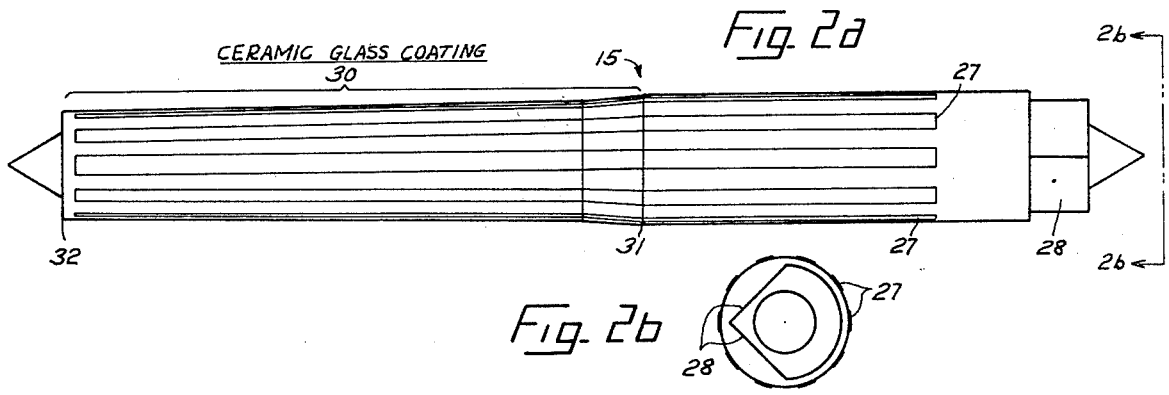

CIRCULAR CONNECTOR

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention relates to a high contact density electrical connector which is not of the conventional pin-and-socket configuration.

(2) Description of the Prior Art

Tapered fasteners are frequently used in the fabrication of aircraft wing and body structures. Their effectiveness in forming a quality joint is often critically dependent on the size, shape, and finish of the hole into which they are inserted. Accurate inspection of such tapered holes, usually numbering in the thousands for a single aircraft, has led to the development of a computer aided analysis technique, in the form of a capacitance sensing probe which is inserted into the structural holes. This inspection technique is considered to be a significant improvement, in terms of manhours expended and measurement reliability, over more conventional means of nondestructive inspection such as boroscope or visual comparison, and use of a profilometer, dye check, protrusion check or air gage.

The inspection method developed uses a segmented capacitance type probe tip formed by having a pattern of conductive paths on the outer surface of the probe tip coated with a high dielectric insulator. When the probe tip is inserted into the hole to be in spected, multiple capacitors are formed between the conductive segments on the probe tip and the metallic walls of the hole. The actual capacitance of each segment is electronically measured and computer analyzed to ascertain the critical parameters associated with that hole.

A variety of fabrication and operational constrains qualify the design of the probe tip. For example, the probe tip must be suitable for use in a production environment; it must be capable of evaluating holes of diameters no more than 0.48 cm; it requires about ten individual conductive segments; and it must be mounted in a connector which maintains accurate and repeatable dimensional tolerances, thereby mitigating the deleterious effects of stray capacitance. Furthermore, with an application entailing repeated insertion of the probe tips into holes in comparatively hard metals such as titanium, and the potential need for changing tip sizes to inspect holes of other dimensions, the capability to replace the probe tips easily, at the point of inspection, is of distinct advantage. Because of this replaceability requirement, the probe tip dimensions, the large number of electrical contacts, and foremost, the critical effects of stray capacitance, the use of conventional connector, such as a pin and socket type, or such variations thereof as shown in U.S. Pat. No. 4,054,346 is not feasible.

SUMMARY OF THE INVENTION

The invention shown and described herein is a circular connector of a unique configuration, being small in dimension yet capable of receiving, indexing, and fixedly retaining a probe tip with a multiplicity of electrical connections. Furthermore, the circular connector is structured so as to introduce a minimum amount of stray capacitance by maintaining a fixed orientation of the conductors with respect to each other.

The electrical conductors on the cylindrical male member are in the form longitudinally oriented segments distributed about the circumference. Along the interior wall of the female circular connector member are connector clips which are similarly oriented and bear upon the electrical conductors of the other member when the two members are rotated into an indexed relationship. The female member is then compressed, to fixedly retain the other member in that orientation during subsequent handling of the connector, by the operation of a compression ring mounted on tapered threads about the female member.

BRIEF DESCRIPTION OF THE DRAWINGS

FIG. 1 contains a cross-sectional view of a complete inspection apparatus, including as one element the circular connector.

FIGS. 2a and 2b show side and end views, respectively, of a representative probe tip designed to mate with the circular connector.

DESCRIPTION OF THE PREFERRED EMBODIMENT

The apparatus as appears in FIG. 1 shows not only one embodiment of the invention but displays in detail the structure surrounding the circular connector taught herein. Referring now to this figure, probe housing 1 is shown to be the outermost structural element of the apparatus. In the preferred configuration, probe housing 1 is of a nonconductive material such as nylon or phenolic and contoured into the form of a handle for direct operator use. At its far right end, with reference to the figure, housing 1 is attached to slide ring 2 by pins 3. Coaxial cable 4 enters the apparatus through strain relief collar 6 and passes thereafter down the center of hollow staff 7. Slide ring 2 has four inwardly extending protrusions in the form of keys which travel in keyways 5 of staff 7. When joined as shown, slide ring 2 and staff 7 form a sliding spline coupling. As the threads in strain relief collar 6 and staff 7 are engaged, split ferrule 8 is compressed about cable 4 by inward chamfer 10 in the end of staff 7. Two circular connector elements, 13 and 16, are attached to the opposite end of staff 7 by retaining nut 9. A conventional helical compression spring 11 encircles staff 7. Slide ring 2, strain relief collar 6, staff 7, split ferrule 8 and retaining nut 9 are preferably fabricated from a fairly strong, conductive and noncorrosive material such as brass.

At the circular connector within the apparatus of FIG. 1, individual wires 12 from coaxial cable 4 enter independent passages in the body of wire separator 13 and are electrically connected, by soldering or other suitable means, at the far right ends of longitudinally extending connector clips 14. Connector clips 14 are mounted in an even distribution on the interior of split bushing 16, in line with the longitudinal axis of the connector. Radial notches 17 and 18 at the opposite ends of split bushing 16 accept the hooked ends of V-shaped connector clips 14 and maintain this orientation during subsequent disturbances, such as occurs when probe tip 15 is replaced. Rotational alignment of wire separator 13 and split bushing 16 is maintained by a pair of indexing protrusions 19 which extend from split bushing 16 to engage a mating pair of recesses in wire separator 13. The outer threads of split bushing 16 are tapered and compatible with an inner set of tapered threads in compression ring 21. By engaging recesses 23 in compression ring 21 torque may be applied to thread the ring onto split bushing 16. As compression ring 21 is threaded onto the bushing, slits 22 in the bushing body allow radial compression of the bushing and connector clips 14 to tightly fix probe tip 15 within the bushing interior.

Representative materials suited for application within the circular connector include brass for compression ring 21 and beryllium copper for connector clips 14. The remaining elements, comprising wire separator 13 and split bushing 16, utilize nonconductive materials such as fiber filled epoxy for the separator and polycarbonate or acetyl resin for the bushing.

Near the left end of the apparatus appearing in FIG. 1 is ground ring 24, slidably mounted over compression ring 21. As with other of the apparatus elements, brass is a preferred material for the ground ring. A conventional electrically conductive helical spring 26 encircles ground ring 24, engaging a lip on the forward edge of ground ring 24 to drive it leftward while pushing at the opposite end against retaining nut 9.

The last element of the apparatus shown in FIG. 1 is probe tip 15. The conductive segments on the outer surface of the probe tip are not shown in the presentation of FIG. 1, but rather, are shown with more specificity in FIG. 2a. The probe tip embodiment described and shown has ten thin gold conductive segments 27 silk screen deposited about its periphery. A very thin high dielectric ceramic glass coating 30 covers the exterior of the probe tip and conductive segments for that portion of the probe tip which is to be inserted into the holes being inspected. Referring to FIG. 2a, the ceramic glass coating is shown extending from the taper, beginning at 31, to the far end 32 of the probe tip.

The indexing key incorporated in that end of the probe tip, which is to be inserted into the circular connector, is difficult to perceive from the cross-sectional view in FIG. 1, yet readily appears as a keyed end seat from the aspect in FIG. 2b. V-shaped keying surfaces 28 interlock with a corresponding structure in region 29 of wire separator 13, to accurately align conductive segments 27 with connector clips 14 attached to wire separator 13. As for probe tip body materials, alumina porcelain has been found to be suitable.

The essence of the invention disclosed, as was noted in the foregoing, is the circular connector. In the embodiment shown, the connector is structurally comprised of wire separator 13, split bushing 16, connector clips 14, and compression ring 21. This configuration of elements forms a unique combination, which has a minimum of stray capacitance, fixes and retains the orientation of the individual connector clips relative to each other to prevent capacitance variations when probe tips are exchanged, precisely indexes the angular orientation of the probe tips during insertion, and facilitates easy removal and installation of probe tips by relatively unskilled users while retaining mechanical rigidity. And finally, all the above are achieved in a relatively small size without the cost and delicacy of minaturization.

Having described the structure of the apparatus above its operation will be explained summarily, being that most is cognizable from the structure. Mounting of probe tip 15 begins by inserting it into the circular connector and rotating it to engage the indexing key. The probe tip is then fixed in place by rotating compression ring 21, with a tool engaging recesses 23 in the ring, until split bushing 16 is drawn tightly about probe tip 15.

With the probe tip mounted and fixed in apparatus the user then inserts the probe tip of the apparatus into the hole undergoing inspection, applying sufficient force to drive forward face 33 of the apparatus flush with the outer surface within which the hole has been drilled. In doing so ground ring 24 makes contact with the metallic surface and is thereby driven into probe housing 1, in opposition to spring 26, until forward face 34 of ground ring 24 is flush with the forward face of compression ring 21. Thereafter, both ground ring 24 and compression ring 21 move into probe housing 1 against the force of spring 11 until face 33 becomes flush with the surface surrounding the hole being inspected. Thereby, a single action of the user forms a ground connection, creates a grounded shield for the capacitance sensitive probe tip, and by action of spring 11 exerts a repeatable magnitude of insertion force on probe tip 15 as it seats within the hole.

If a probe tip is damaged or needs to be exchanged with another of a differing size, the structural elements of the circular connector permit easy substitution while retaining mechanical rigidity and orientational precision during subsequent use.

I claim:

1. A high density circular connector, comprising:
  a. an electrically non-conductive cylindrical male member, having longitudinal conductive segments distributed about its circumference and substantially flush therewith;
  b. a V-shaped key, at the inserted end of the male member, for indexing the male member about its cylindrical axis of rotation;
  c. an electrically non-conductive female member having a cylindrical passage therethrough, attachment notches at either end of said passage for fixedly retaining multiple connector clips concentric with and along the surface of the cylindrical passage, and a split bushing structural segment, having a tapered and threaded exterior, for engaging a compression ring and concentrically reducing the circumference of the cylindrical passage sufficiently to retain the male member;
  d. a V-shaped keyway at one end of said passage in the female member compatible with the V-shaped key of the male member so that each conductive segment is aligned with its respective connector clip when the two members are completely mated; and
  e. multiple conductive connector clips of an elongated shape, having opposite ends thereof fitting into the female member attachment notches, extending slightly into the passage and being electrically connected from their innermost ends.

* * * * *